US009118535B2

(12) United States Patent
Narasimhan et al.

(10) Patent No.: US 9,118,535 B2
(45) Date of Patent: Aug. 25, 2015

(54) METHOD AND APPARATUS FOR CONFIGURING A FREQUENCY DEPENDENT I/Q IMBALANCE COMPENSATION FILTER

(71) Applicant: MediaTek Singapore Pte. Ltd., Singapore (SG)

(72) Inventors: Balachander Narasimhan, Milpitas, CA (US); Charles Chien, Newbury Park, CA (US); Sheng-Hong Yan, Tainan (TW); Paul Cheng Po Liang, Hsinchu County (TW)

(73) Assignee: MediaTek Singapore Pte. Ltd., Singapore (SG)

(*) Notice: Subject to any disclaimer, the term of this patent is extended or adjusted under 35 U.S.C. 154(b) by 0 days.

(21) Appl. No.: 14/205,369

(22) Filed: Mar. 12, 2014

(65) Prior Publication Data

US 2014/0273907 A1 Sep. 18, 2014

Related U.S. Application Data

(60) Provisional application No. 61/791,081, filed on Mar. 15, 2013.

(51) Int. Cl.
*H04B 1/10* (2006.01)
*H04L 27/38* (2006.01)
*H04B 17/00* (2015.01)

(52) U.S. Cl.
CPC .................................. *H04L 27/3863* (2013.01)

(58) Field of Classification Search
CPC .......... H04B 1/12; H04B 1/123; H03D 7/165; G01S 2007/358
USPC .................. 455/295, 296, 302, 305, 306
See application file for complete search history.

(56) References Cited

U.S. PATENT DOCUMENTS 7,783,273 B2 * 8/2010 Maeda et al. ................. 455/285
2013/0069738 A1 3/2013 Tsuie

OTHER PUBLICATIONS

Cavers, Adaptive Compensation for Imbalance and Offset Losses in Direct Conversion Transceivers, IEEE Transactions on Vehicular Technology, vol. 42, No. 4, pp. 581-588, Nov. 1993.
Anttila, Circularity-Based I/Q Imbalance Compensation in Wideband Direct-Conversion Receivers, IEEE Transactions on Vehicular Technology, vol. 57, No. 4, pp. 2099-2113, Jul. 2008.
Luo, Efficient Self-Calibration of Frequency-Dependent I/Q-Imbalance in Direct-Conversion OFDM Transceivers, pp. 413-416, 2009 IEEE.
Lin, Time Domain Blind I/Q Imbalance Compensation Based on Real-Valued Filter, IEEE Transactions on Wireless Communications, vol. 11, No. 12, pp. 4342-4350, Dec. 2012.

* cited by examiner

*Primary Examiner* — Lee Nguyen
(74) *Attorney, Agent, or Firm* — Winston Hsu; Scott Margo

(57) ABSTRACT

A method of configuring at least one frequency dependent (FD), in-phase/quadrature (I/Q), imbalance compensation filter within a radio frequency (RF) module is described. The method includes applying an input signal to an input of the RF module, receiving a filtered I-path signal for the RF module and deriving at least one I-path filtering estimate value therefrom, receiving a filtered Q-path signal for the RF module and deriving at least one Q-path filtering estimate value therefrom, and configuring the at least one FD I/Q imbalance compensation filter based at least partly on at least one ratio between the derived I-path and Q-path filtering estimate values.

19 Claims, 10 Drawing Sheets

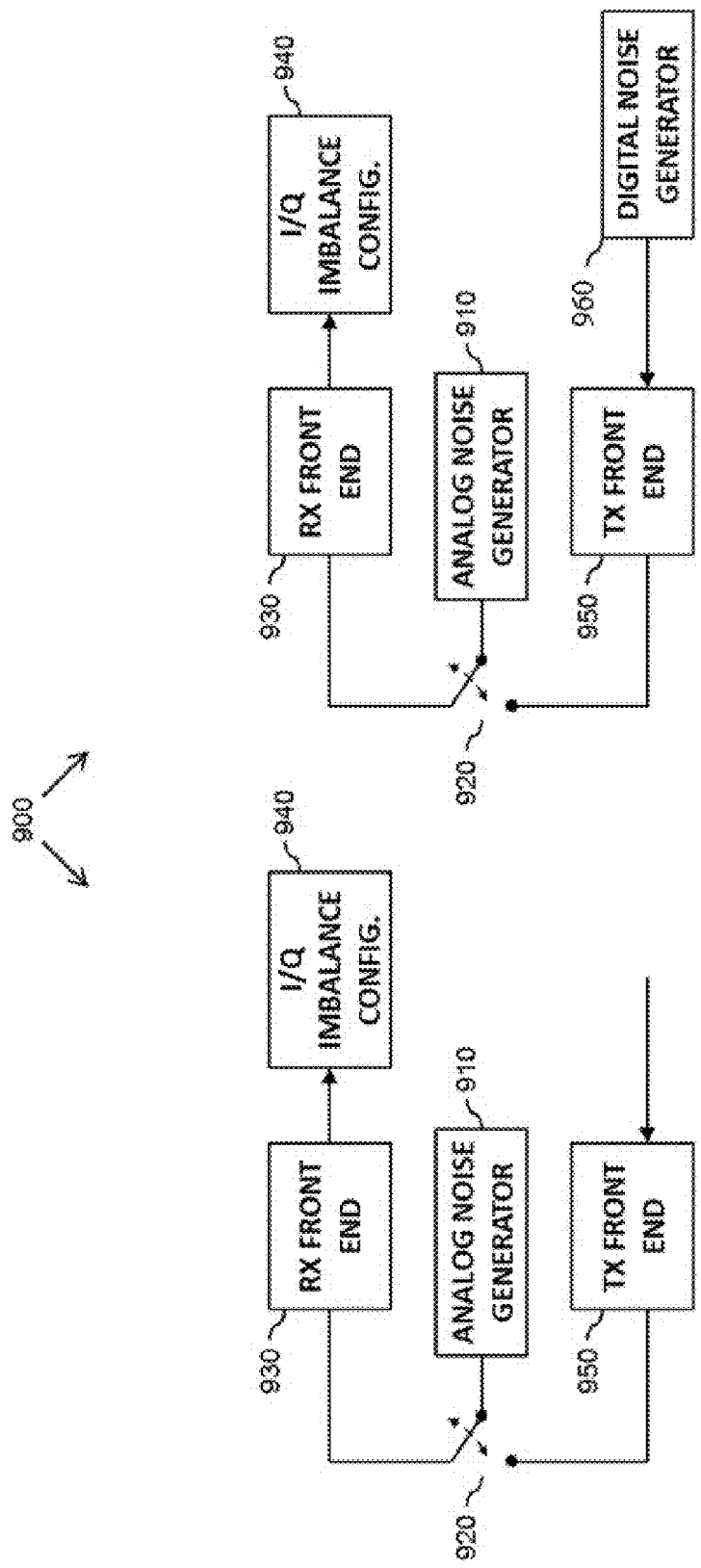

METHOD AND APPARATUS FOR CONFIGURING A FREQUENCY DEPENDENT I/Q IMBALANCE COMPENSATION FILTER

CROSS REFERENCE TO RELATED APPLICATIONS

This application claims the benefit of U.S. provisional application No. 61/791,081, filed on Mar. 15, 2013 and incorporated herein by reference.

BACKGROUND

1. Field of the Invention

The field of this invention relates to a method and apparatus configuring at least one frequency dependent (FD), in-phase/quadrature (I/Q), imbalance compensation filter within, say, a radio frequency (RF) module.

2. Background of the Invention

A primary focus and application of the present invention is the field of radio frequency (RF) receivers capable of use in wireless telecommunication applications. FIG. 1 illustrates a simplified block diagram of an example of an RF receiver architecture 100 such as may be used in a wireless telecommunication apparatus; for example such as user equipment in third generation partnership project (3GPP™) parlance. In the illustrated example, the RF receiver architecture 100 comprises an in-phase (I) branch and a quadrature (Q) branch. An input of each of the 'I' and 'Q' branches is operably coupled to an antenna 105. In each of the 'I' and 'Q' branches, RF signals received via the antenna 105 are provided to a mixer component 110, 115, which mixes the a received RF signal with a sine wave signal from a local oscillator 120 to down convert a wanted frequency signal of the received RF signal to an intermediate or baseband frequency. The sine wave signal from the local oscillator 120 provided to one of the 'I' or 'Q' branches (the 'Q' branch in the illustrated example) is phase shifted 90 degrees. The down converted signals output by the respective mixers 110, 115 in each of the 'I' and 'Q' branches are then provided to low pass filters ($h_I(n)$, $h_Q(n)$) 130, 135 which filer out unwanted frequency components of the down converted signals. The filtered signals are then provided to analogue to digital converters (ADCs) 140, 145, which output digital signals ($z_I(n)$, $z_Q(n)$) 150, 155 representative of the filtered, down converted signals.

In practical receivers, the analogue components within the in-phase and quadrature branches, and in particular the respective low pass filters 130, 135, tend not to be exactly matched, and thus can degrade the image rejection ratio (IRR) of the receiver, thereby resulting in performance loss. The use of high-order modulation schemes in modern wireless standards, such as for example 64-QAM modulation used in the LTE (Long Term Evolution) wireless standards and 256-QAM modulation used in IEEE 802.11ac wireless standards, dictates high IRR requirements of 40 to 50 dB. Furthermore, the use of large bandwidths such as, for example, 20 MHz in LTE and 160 MHz in IEEE 802.11ac, result in significant frequency dependent I/Q imbalances.

FIG. 2 illustrates a simplified block diagram of an example of a typical I/Q imbalance compensation architecture such as may be implemented for the RF receiver 100 of FIG. 1. Trying to reduce the I/Q imbalance using analogue design would significantly increase the cost of the RF chipset. As such, compensating for the I/Q imbalance is preferably implemented within the digital domain, for example within a digital signal processing component 200, but costs, area and/or power must be kept low. The I/Q imbalance typically comprises two components: a frequency dependent (FD) component and a frequency independent (FI) components. In the illustrated example, the I/Q imbalance compensation architecture comprises an FD I/Q imbalance compensation filter ($\beta(n)$) 210 and an FI I/Q imbalance compensation scalar component ($\alpha$) 220 and adder component 230. The FD I/Q imbalance compensation filter ($\beta(n)$) 210 is implemented within the Q-branch of the digital domain in the illustrated example and arranged to filter the digital Q-branch signal 155 such that the joint filtering performed by the Q-branch analogue low pass filter 135 and the digital FD I/Q imbalance compensation filter ($\beta(n)$) 210 matches the filtering performed by the I-branch analogue low pass filter 130. The FI I/Q imbalance compensation scalar component 220 and the adder component 230 compensate for FI I/Q imbalance.

The FD I/Q imbalance compensation filter ($\beta(n)$) 210 may alternatively implemented within the I-branch of the digital domain and arranged to filter the digital I-branch signal 150 such that the joint filtering performed by the I-branch analogue low pass filter 130 and the digital FD I/Q imbalance compensation filter ($\beta(n)$) 210 matches the filtering performed by the Q-branch analogue low pass filter 135.

In the example illustrated in FIG. 2, the incoming digital signal before compensation may be expressed as:

$$z(n)=z_I(n)+jz_Q(n) \quad \text{[Equation 1]}$$

Following the FD I/Q imbalance compensation, the signal may be expressed as:

$$u(n)=u_I(n)+ju_Q(n) \quad \text{[Equation 2]}$$

Notably, $u_I(n)=z_I(n)$. Whilst the basic architecture illustrated in FIG. 2 for compensating for I/Q imbalance is commonly implemented within RF receivers, various techniques for configuring the FD I/Q imbalance compensation filter ($\beta(n)$) 210 have been proposed.

One approach for configuring the FD I/Q imbalance compensation filter ($\beta(n)$) 210 involves training based techniques. One such training based technique for configuring the FD I/Q imbalance compensation filter ($\beta(n)$) 210 is illustrated in FIG. 3a, and comprises using specially designed training sequences through loopback from the transmitter to the receiver of the RF transceiver module, through the RF front-end. Such a technique is deterministic (non-stochastic), and therefor fast. However, such a technique requires the transmitter frequency to be offset from the receiver frequency to specific values for configuration, which may require difficult modifications to the transceiver architecture.

A further training based technique for configuring the FD I/Q imbalance compensation filter ($\beta(n)$) 210 is illustrated in FIG. 3b, and comprises the use of an envelope detector whereby in a first step (with switch s1 open and switch s2 closed) the transmitter of the RF transceiver is configured using the envelope detector, and in a second step (with switch s1 closed and switch s2 open) the receiver of the RF transceiver is configured using the envelope detector and a loopback from the transmitter. Once again, such a technique is deterministic (non-stochastic), and therefor fast. However, this technique is sensitive to transmitter distortion, such as linearity and harmonics.

In addition to the disadvantages already mentioned, such training based approaches also require modifications in the baseband or RF architectures, and require complex additional circuitry such as envelope detectors or tone-generators. Furthermore, such training based approaches do not facilitate 'on-the-fly' configuration.

Another approach for configuring the FD I/Q imbalance compensation filter ($\beta(n)$) 210 involves the use of blind algorithms. For example, one known blind algorithm technique for configuring the FD I/Q imbalance compensation filter (β(n)) 210 is illustrated in FIG. 3c, and comprises iterative estimation of β(n) using non-linear equations, such as:

$$E\{u_I(n)u_I(n-k)\}=E\{u_Q(n)u_Q(n-k)\}\forall k \quad \text{[Equation 1]}$$

where $u_Q(n)=\beta(n)*z_Q(n)$ and $u_I(n)=z_I(n)$. Autocorrelations of $z_I(n)$ and $z_Q(n)$ at various delays are computed by averaging several incoming data samples. A benefit of such a technique is that β(n) may be solved using a circularity property. However, such a solution using a non-linear iterative technique involves using a matrix inversion, and thus the complexity of such a solution is prohibitive for filter lengths of greater than three.

A second known blind algorithm technique for configuring the FD I/Q imbalance compensation filter β(n) 210 is illustrated in FIG. 3d, and comprises adaptively updating the estimate for the k-th tap of the FD I/Q imbalance compensation filter (β(n)) 210 using the equation:

$$\beta_k(n)=\beta_k(n-1)+\mu(u_I(n)u_I(n-k)-u_Q(n)u_Q(n-k))\forall k \quad \text{[Equation 2]}$$

This approach is effectively a crude approximation of the previous blind algorithm technique, which has the advantage of reduced complexity and memory requirements. However this method results in an inferior configuration of the FD I/Q imbalance compensation filter (β(n)) 210, and thus an inferior performance of the receiver.

A further known blind algorithm technique for configuring the FD I/Q imbalance compensation filter (β(n)) 210 comprises obtaining the autocorrelations of $z_I(n)$ and $z_Q(n)$ as for the first blind algorithm technique illustrated in FIG. 3c and described above. Discrete Fourier Transforms (DFT's) of the autocorrelations are then computed and divided to obtain a magnitude of β(n). Assuming a minimum phase β(n), the phase of n) is then computed using the Hilbert transform. The Inverse Discrete Fourier Transform (IDFT) of the frequency response is then computed to obtain the impulse response of β(n). Advantageously, this technique produces an almost linear solution of lower complexity than the first blind algorithm technique illustrated in FIG. 3c and described above. However, it is still a relatively high complexity solution requiring significant processing/memory resources. Furthermore, the underlying spectral estimation scheme is non-parametric and hence performance is in general poor. In addition, the performance degrades in a dispersive channel for on-the-fly configuration, and performance is sensitive to spectral nulls resulting in less flexibility in relation to range of sampling rates.

In addition to the disadvantages already mentioned, such known blind algorithm based approaches in general suffer from high-complexity, for example requiring non-linear equations to be solved using iterative methods.

An alternative known technique for configuring the FD I/Q imbalance compensation filter (β(n)) 210 is illustrated in FIG. 3e, and comprises setting the phase difference between the 'I' and 'Q' branches to be 45°. Prior to the introduction of any I/Q imbalance, the 'I' and 'Q' signals are orthogonal to each other. By shifting the phase difference between the 'I' and 'Q' branches to 45°, the I-branch signal leaks to the Q-branch through the FD I/Q imbalance compensation filter (β(n)) 210. By using the I-branch signal as a reference, β(n) may be estimated using adaptive noise cancellation. Advantageously, the computational complexity of such a technique is similar to a least mean square (LMS) computation, and thus is significantly lower than for the known blind algorithm techniques. However, setting the phase difference between the 'I' and 'Q' branches to be 45° requires the local oscillator (LO) frequency to be quadrupled, and requires a gain loss of 3 dB, typically (LO's with 25% duty-cycle), to be compensated for. As such, this technique results in an increased power consumption of the RF circuitry, and also results in a degradation of the noise performance when limited by headroom. Such increases in power consumption and degradation of the noise performance are particularly problematic for higher frequency designs such as used for LTE and IEEE 802.11ac wireless standards.

Accordingly, there is a need for a technique for configuring the FD I/Q imbalance compensation filter (β(n)) 210 that requires no, or minimal, additional circuitry or modifications to the transceiver front-end architecture, which involve increases in power consumption and/or cost, and that comprises a reduced complexity compared with known blind algorithm techniques to minimise required digital logic.

SUMMARY

Accordingly, the invention seeks to mitigate, alleviate or eliminate one or more of the above mentioned disadvantages singly or in any combination. Aspects of the invention provide a method and apparatus for configuring at least one frequency dependent (FD), in-phase/quadrature (I/Q), imbalance compensation filter within a radio frequency (RF) module.

According to a first aspect of the invention, there is provided a method of configuring at least one frequency dependent (FD), in-phase/quadrature (I/Q), imbalance compensation filter within a radio frequency (RF) module. The method comprises applying an input signal to an input of the RF module, receiving a filtered I-path signal for the RF module and deriving at least one I-path filtering estimate value therefrom, receiving a filtered Q-path signal for the RF module and deriving at least one Q-path filtering estimate value therefrom, and configuring the at least one FD I/Q imbalance compensation filter based at least partly on at least one ratio between the derived I-path and Q-path filtering estimate values.

In this manner, by using a ratio between I-path and Q-path filtering estimate values to configure the coefficient(s) for the FD I/Q imbalance compensation filter, it is not necessary to accurately derive the complete filtering performed on each of the 'I' and 'Q' paths within the RF module. It is sufficient to only estimate filtering values that are representative of the difference between 'I' and 'Q' path filtering. As such, the computational complexity of obtaining such estimate filtering values may be significantly reduced as compared with conventional blind algorithm techniques.

According to a second aspect of the invention, there is provided filter coefficient configuration module for configuring at least one coefficient for at least one frequency dependent (FD), in-phase/quadrature (I/Q), imbalance compensation filter within a radio frequency (RF) module. The filter coefficient configuration module is arranged to receive a filtered I-path signal for the RF module and derive at least one I-path filtering estimate value therefrom, receive a filtered Q-path signal for the RF module and derive at least one Q-path filtering estimate value therefrom, and configure the at least one coefficient for the at least one FD I/Q imbalance compensation filter based at least partly on at least one ratio between the derived I-path and Q-path filtering estimate values.

According to a third aspect of the invention, there is provided an integrated circuit device comprising at least one filter coefficient configuration module according to the second aspect of the present invention.

These and other aspects of the invention will be apparent from, and elucidated with reference to, the embodiments described hereinafter.

BRIEF DESCRIPTION OF THE DRAWINGS

Further details, aspects and embodiments of the invention will be described, byway of example only, with reference to the drawings. In the drawings, like reference numbers are used to identify like or functionally similar elements. Elements in the figures are illustrated for simplicity and clarity and have not necessarily been drawn to scale.

FIGS. 9a and 9b illustrate simplified block diagrams of an example of an apparatus for configuring FD I/Q imbalance compensation filters within each of an RF receiver module and an RF transmitter module of an RF transceiver.

DETAILED DESCRIPTION

Examples of the invention will be described in terms of one or more radio frequency, RF, transceiver modules for use in a wireless communication unit, such as user equipment in third generation partnership project (3GPP™) parlance. However, it will be appreciated by a skilled artisan that the inventive concept herein described may be embodied in any type of RF module, wireless communication unit or wireless transceiver that comprises discrete I-path and Q-path filtering. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
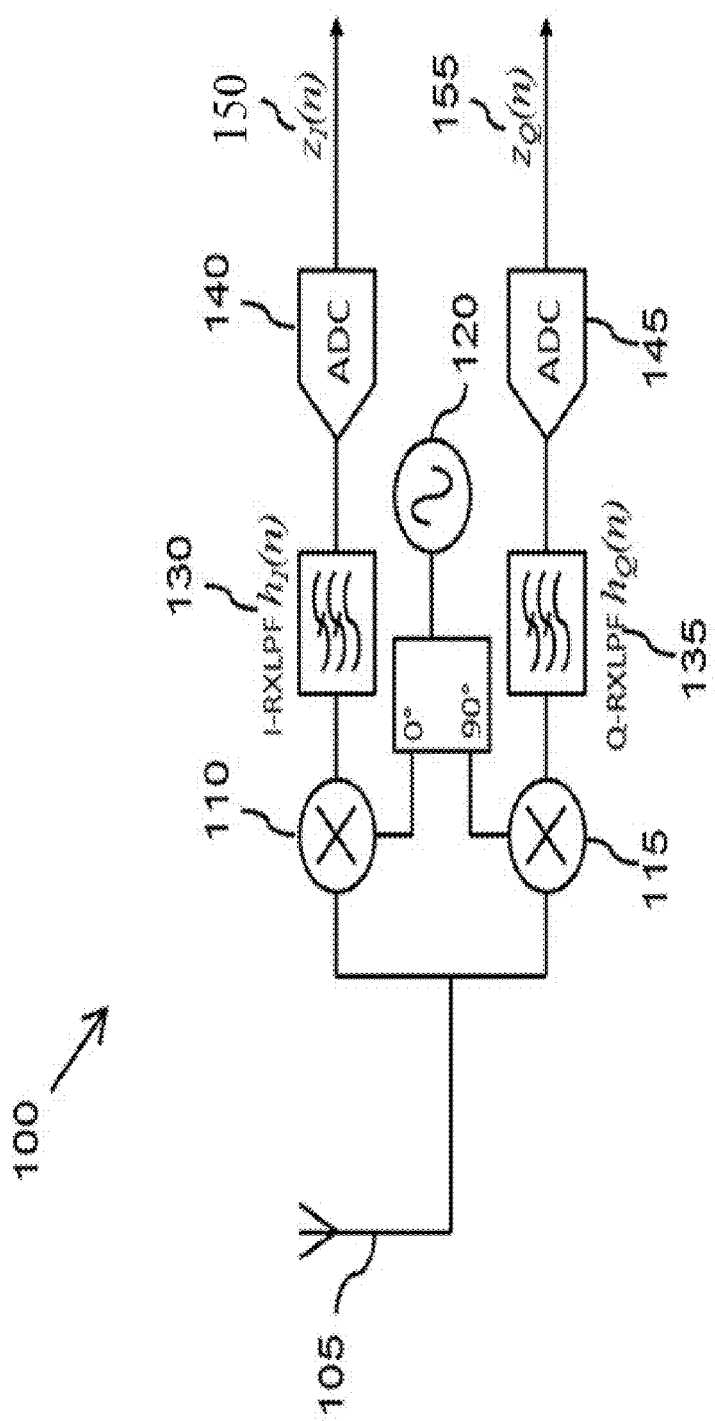
FIG. 1 illustrates a simplified block diagram of an example of a radio frequency (RF) receiver architecture.
Figure 2:
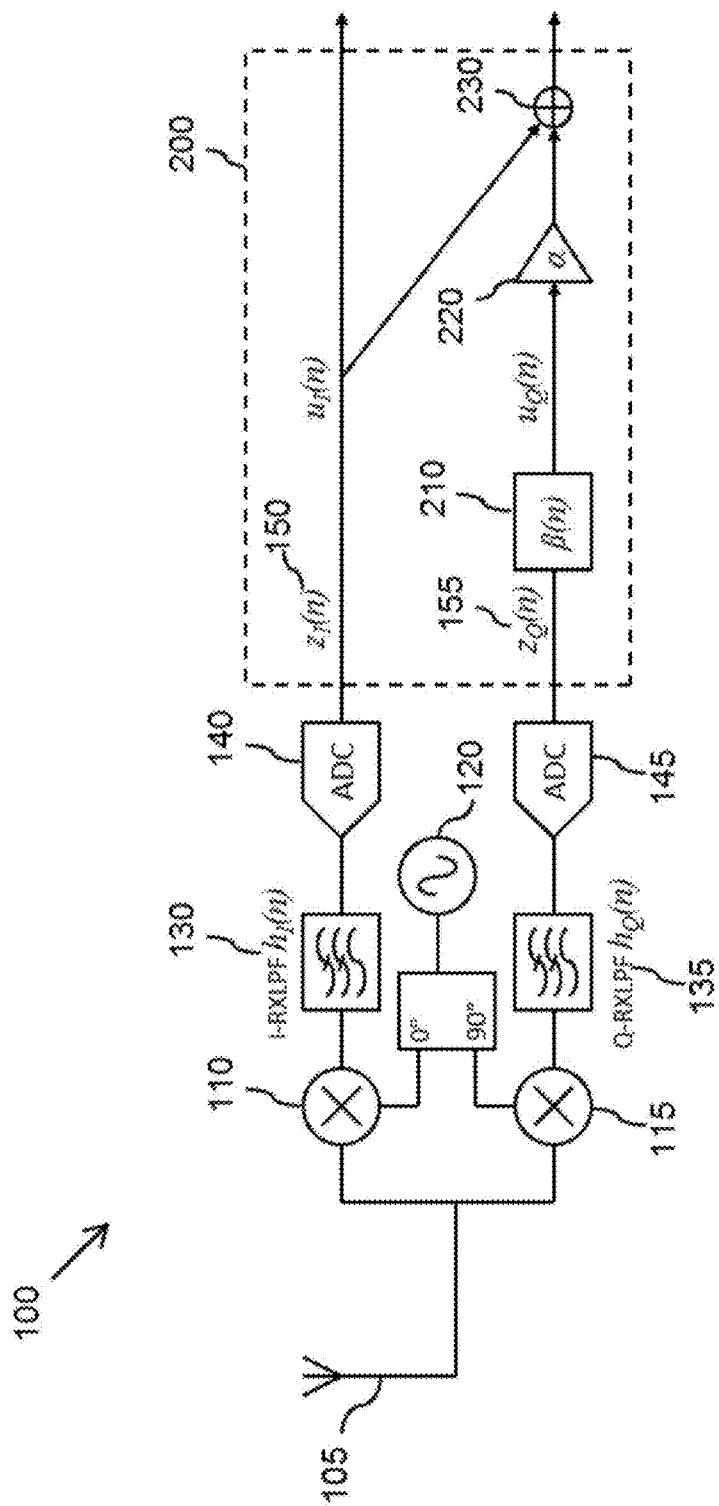
FIG. 2 illustrates a simplified block diagram of an example of a typical in-phase/quadrature (I/Q) imbalance compensation architecture.
Figure 4:
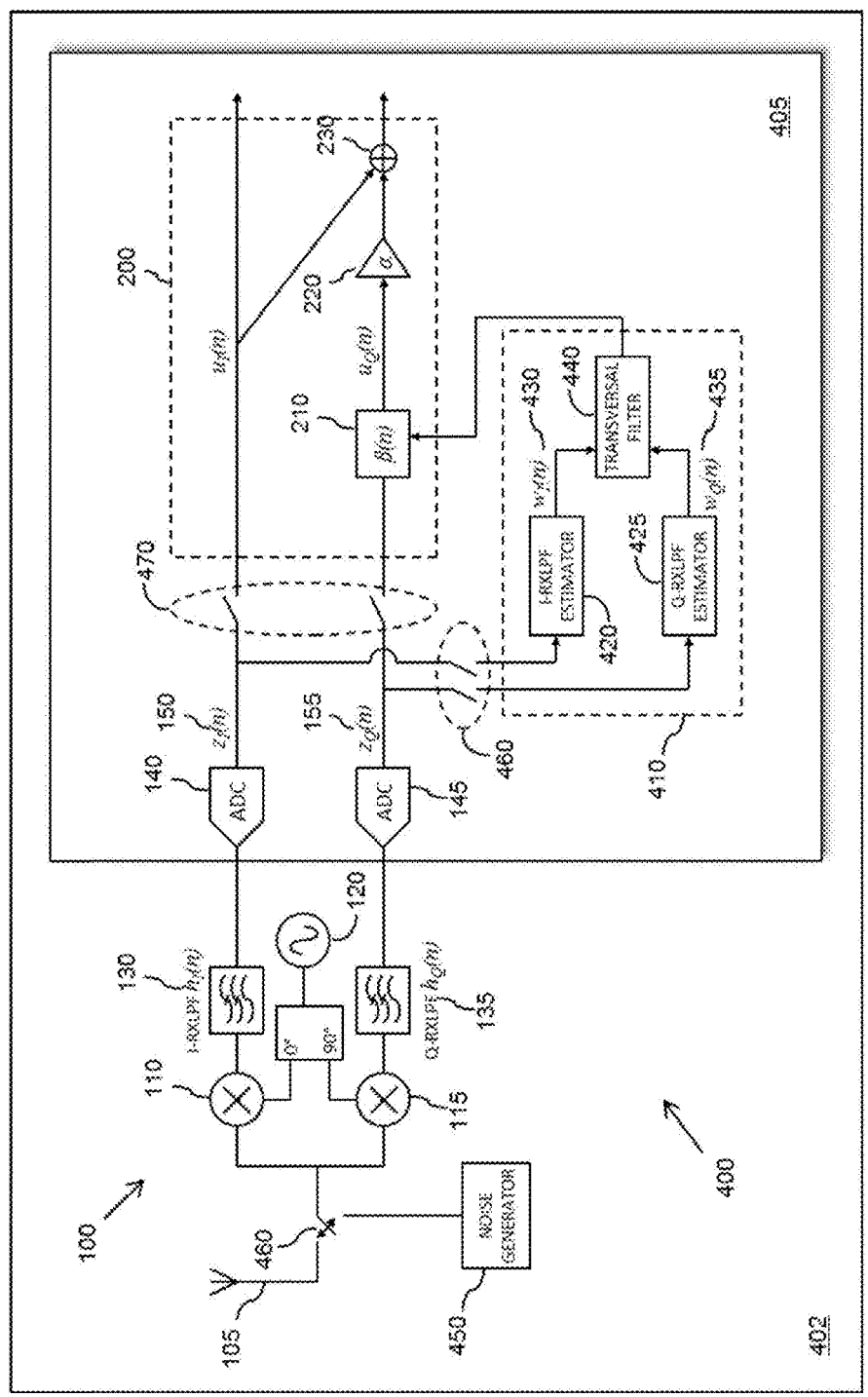
FIG. 4 illustrates a simplified block diagram of an example of an apparatus for configuring an FD I/Q imbalance compensation filter.

Referring now to FIG. 4, there is illustrated a simplified block diagram of an example of an apparatus 400 for configuring a frequency dependent (FD), in-phase/quadrature (I/Q), imbalance compensation filter within an RF receiver module, such as the FD I/Q imbalance compensation filter 210 of the RF receiver module 100 illustrated in FIG. 2. In the example illustrated in FIG. 4, the FD I/Q imbalance compensation filter 210 forms part of a wireless communication unit, such as a cellular telephone handset, illustrated generally at 402. Such wireless communication units are well known in the art, and as such only those components of the communication unit 402 considered necessary for the understanding of the invention have been illustrated and described, and it will be appreciated that the communication unit 402 may comprise various other components not illustrated or described herein.

The apparatus 400 comprises a filter coefficient configuration module 410 for configuring one or more coefficient(s) β(n) for at least one FD I/Q imbalance compensation filter 210 within an RF receiver module 100. In the illustrated example, the filter coefficient configuration module 410 is implemented within the digital domain, for example by way of digital hardware components within an integrated circuit device 405. In some examples, the filter coefficient configuration module 410 may be implemented within the same integrated circuit device as the FD I/Q compensation filter 210, as illustrated in FIG. 4. In the illustrated example, the filter coefficient configuration module 410 is selectively coupled via switching elements 460 to the output of each of the I-path ADC 140 and Q-path ADC 145. Further switching elements 470 may also be provided to selectively isolate the outputs of the ADC's 140, 145 from the rest of the receiver chain, for example during configuration of the FD I/Q imbalance compensation filter 210.

In this manner, the filter coefficient configuration module 410 is arranged to receive a filtered I-path signal for the RF receiver module 100, such as the digital signal ($z_I(n)$) 150 output by the I-path ADC 140, and to derive at least one I-path filtering estimate value $w_I(n)$ therefrom. The filter coefficient configuration module 410 is further arranged to receive a filtered Q-path signal for the RF receiver module 100, such as the digital signal ($z_Q(n)$) 155 output by the Q-path ADC 145, and to derive at least one Q-path filtering estimate value $w_Q(n)$ therefrom. The filter coefficient configuration module 410 is still further arranged to configure the coefficient(s) β(n) for the FD I/Q imbalance compensation filter 210 based at least partly on at least one ratio between the derived I-path and Q-path filtering estimate values.

For example, the FD I/Q imbalance compensation filter 210 illustrated in FIG. 4 comprises a filter component of, say, length L. Accordingly, the filter coefficient configuration module 410 may be arranged to derive an I-path filtering estimate $w_I(n)$ comprising L coefficient estimate values, and a Q-path filtering estimate $w_Q(n)$ comprising L coefficient estimate values. The filter coefficient configuration module 410 may further be arranged to configure L coefficient values for the filter component of the FD I/Q imbalance compensation filter 210 based at least partly on coefficient ratios between the derived I-path and Q-path coefficient estimate values.

The filter coefficient configuration module 410 illustrated in FIG. 4 comprises a first, I-path filter estimator component (also denoted as "I-RXLPF estimator") 420 arranged to receive the filtered I-path signal ($z_I(n)$) 150, and to derive the I-path filtering estimate value(s) ($w_I(n)$) 430 therefrom. The filter coefficient configuration module 410 illustrated in FIG. 4 further comprises a second, Q-path filter estimator component (also denoted as "Q-RXLPF estimator) 425 arranged to receive the filtered Q-path signal $z_Q(n)$ 155, and to derive the Q-path filtering estimate value(s) ($w_Q(n)$) 435 therefrom. The coefficient(s) β(n) for the FD I/Q imbalance compensation filter 210 may then be configured based on a ratio between the I-path and Q-path filtering estimate values ($w_I(n)$) 430 and ($w_Q(n)$) 435 derived by the filter estimator components 420, 425.

Conventional blind algorithm techniques rely on deriving the complete filtering performed on each of the 'I' and 'Q' paths in order to compute the coefficient(s) β(n) for FD I/Q imbalance compensation filters, and thus suffer from the high computational complexity involved with such calculations. Advantageously, by using a ratio between I-path and Q-path filtering estimate values ($w_I(n)$) 430 and ($w_Q(n)$) 435 to configure the coefficient(s) β(n) for the FD I/Q imbalance compensation filter 210, it is not necessary to accurately derive the complete filtering performed on each of the 'I' and 'Q' paths within the RF module. It is sufficient to only estimate filtering values that are representative of the difference between 'I' and 'Q' path filtering. As such, the computational complexity of obtaining such estimate filtering values may be significantly reduced as compared with conventional blind algorithm techniques.

Accordingly, the filter estimator components 420, 425 illustrated in FIG. 4 may derive the respective filtering estimate values ($w_I(n)$) 430 and ($w_Q(n)$) 435 in any suitable manner. For example, an input signal comprising a circularly symmetric distribution may be applied to the input of the RF receiver module 100, and the filtering estimate values ($w_I(n)$) 430 and ($w_Q(n)$) 435 may be derived using one or more linear prediction techniques. One such linear prediction technique contemplated for deriving the filtering estimate values ($w_I(n)$) 430 and ($w_Q(n)$) 435 comprises using the Levinson-Durbin Recursion algorithm. As will be appreciated by a skilled artisan, the use of a linear prediction technique such as the Levinson-Durbin Recursion algorithm may result in deriving filtering estimate values ($w_I(n)$) 430 and ($w_Q(n)$) 435 representative of the inverse of the actual filtering performed in the respective 'I' and 'Q' paths of the RF module 100. Nevertheless, the ratio between such inverse filtering values is proportional to the ratio of the actual filtering performed in the respective 'I' and 'Q' paths of the RF module 100, and thus may be used for configuring the coefficient(s) β(n) for the FD I/Q imbalance compensation filter 210. Significantly, deriving an estimate value representative of the inverse of the filtering performed is computationally less complex than deriving a non-inverse estimate of the filtering performed.

An example of estimating the inverses of the 'I' and 'Q' path filtering using a linear prediction technique, and in particular using Levinson-Durbin recursion is provided below. Table 1 below illustrates quantities to be computed or otherwise determined in each $k^{th}$ iteration of the Levinson-Durbin recursion algorithm (where k=2 to L and L is the length of the FD I/Q imbalance compensation filter 210) along with the computational complexity per iteration:

TABLE 1

| Qty Name. (type) | Computation/iteration | Complexity/ iteration |
|---|---|---|
| Q1 (scalar) | $\lambda(k) = \dfrac{P(k)}{R_k + \sum_{j=1}^{k-1} a_j(k-1)R_{k-j}}{E(k-1)}$ | k − 1 real mul-add, 1 real div |
| Q2 (vector) | a(k) = ã(k − 1) + λ(k) · flipud(ã(k − 1)) | k − 1 real mul-add |
| Q3 (scalar) | E(k) = E(k − 1) + λ(k)P(k) | 1 real mul-add |

In the first iteration, initialization is performed based on the following:

$$a(1) = \begin{bmatrix} 1 \\ a_1(1) \end{bmatrix};$$

$$E(1) = R_0 + a_1(1)R_1 \text{ where } a_1(1) = -\frac{R_1}{R_0}$$

Subsequently, the vector a(k) is computed:

$$a(k) = \begin{bmatrix} 1 \\ a_1(k) \\ \vdots \\ a_k(k) \end{bmatrix};$$

$$\tilde{a}(k) = \begin{bmatrix} a(k) \\ 0 \end{bmatrix}$$

with the size of the vector a(k) increasing with each recursion step (iteration). a(L+1) is the final desired result, comprising a length L+1.

The computation complexity for the initialization may be equated to one real multiplication-addition operation and one real division operation. For each $k^{th}$ iteration of the algorithm, the computation complexity may be equated to 2k−1 real multiplication-addition operations and one real division operation. Thus, the total computation complexity for the initialization and all subsequent iterations of the algorithm may be equated to $L^2+1$ real multiplication-addition operations and L real division operations.

Referring back to FIG. 4, in some examples the filter estimator components 420, 425 may be implemented by way of hardware components arranged to perform the above computations. For example, L+1 correlations are required for implementing a Levinson-Durbin Recursion algorithm. The algorithm computes a vector of length 'L+1' whose first element is 1 followed by L other values. As such, each filter estimator component 420, 425 may comprise L+1 buffers for storing samples of the respective filtered I-path and Q-path signals ($z_I(n)$) 150, ($z_Q(n)$) 155. Each filter estimator component 420, 425 may further comprise L+1 multipliers and L+1 accumulators (an n-bit accumulator comprising an n-bit adder and an n-bit register) for performing the required multiplication-addition computations on the stored samples of the respective filtered I-path and Q-path signals ($z_I(n)$) 150, ($z_Q(n)$) 155 to derive the filtering estimate values ($w_I(n)$) 430 and ($w_Q(n)$) 435. Accordingly, the total required number of hardware components for implementing the two filter estimator components 420, 425 in the illustrated example may be limited to:

2(L+1) buffers;
2(L+1) multipliers; and
2(L+1) accumulators.

In the example illustrated in FIG. 4, the FD I/Q imbalance compensation filter 210 comprises a single filter component within the Q-path of the RF receiver module 100, arranged to apply FD I/Q imbalance compensation filtering to the filtered Q-path signal ($z_Q(n)$) 155. In this manner, FD I/Q imbalance compensation is only applied to the filtered Q-path signal ($z_Q(n)$) 155. Accordingly, in the example illustrated in FIG. 4, the filter coefficient configuration module 410 is arranged to determine one or more filtering ratio value(s) for the I-path and Q-path of the RF module 100 based (at least partly) on the I-path and Q-path filtering estimate values ($w_I(n)$) 430 and ($w_Q(n)$) 435. The coefficient(s) β(n) for the FD I/Q imbalance compensation filter 210 may then be obtained substantially directly from the determined filtering ratio value(s) for the I-path and Q-path of the RF module 100.

To obtain coefficient(s) β(n) for the FD I/Q imbalance compensation filter 210 based directly on the ratio(s) between the derived I-path and Q-path filtering estimate values ($w_I(n)$) 430 and ($w_Q(n)$) 435, the I-path and Q-path filtering estimate values ($w_I(n)$) 430 and ($w_Q(n)$) 435 are required to be divided in the frequency domain. However, the I-path and Q-path filtering estimate values ($w_I(n)$) 430 and ($w_Q(n)$) 435 are obtained in the time domain. Performing a Fast Fourier Transform (FFT) to convert the filtering estimate values into the frequency domain within which the filtering estimate values may be divided and subsequently performing an Inverse Fast Fourier Transform (IFFT) to convert the results of the division back into the time domain would require a high degree of computational complexity.

The equivalent operation may be performed in the time domain by having the numerator filter in the forward taps and denominator filter in the reverse taps of a transversal infinite impulse response (IIR) filter, and to obtain the output for an impulse sequence input. At the output, we need only so many values as the number of taps (i.e coefficient(s) β(n)) for compensation. This process is shown to have a lower number of operations than the FFT-IFFT method for a practical number of taps.

Accordingly, the filter coefficient configuration module 410 illustrated in FIG. 4 is arranged to determine the filtering ratio value(s) using such a transversal filter technique, and as such comprises a transversal IIR filter (also denoted as "transversal filter") 440.

Figure 5:
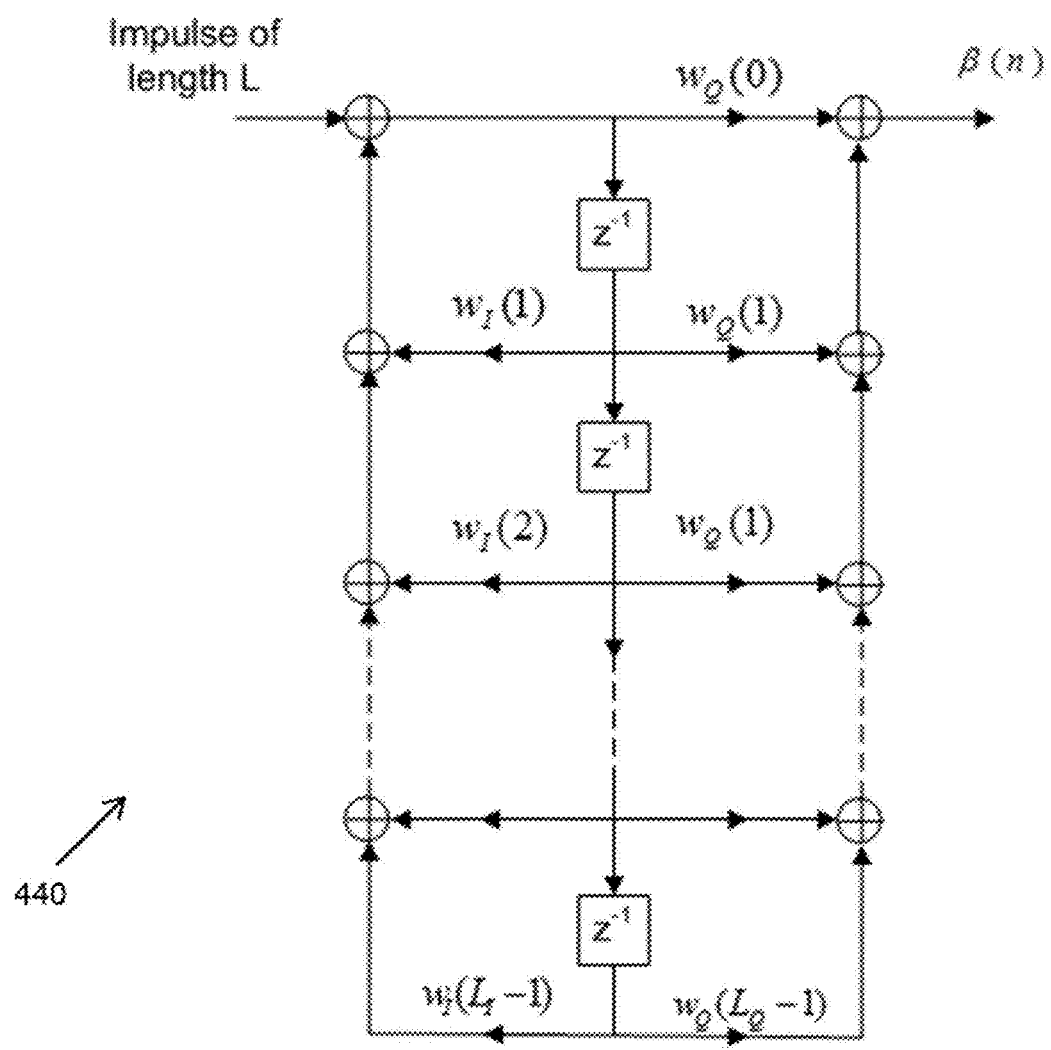
FIG. 5 illustrates a simplified structural diagram of an example of the transversal infinite impulse response (IIR) filter.

FIG. 5 illustrates a simplified structural diagram of an example of the transversal IIR filter 440. In the example illustrated in FIG. 5, the transversal IIR filter 440 comprises a Direct Form-II IIR transversal filter structure. An impulse of length-L is passed through the transversal filter structure to obtain the coefficient(s) β(n) for the FD I/Q imbalance compensation filter 210. For the example illustrated in FIG. 5, the coefficients β(n) obtained via the transversal IIR filter 440 may be expressed as:

$$\beta(n) = \sum_{m=1}^{L-1} w_Q(n)\beta(n-m) + w_I(n)$$

with individual coefficient values for individual taps of the FD I/Q imbalance compensation filter 210 defined as:

$\beta(0) = w_I(0)$ $\beta(1) = w_Q(1)\beta(0) + w_I(1)$ $\beta(2) = w_Q(1)\beta(1) + w_Q(2)\beta(0) + w_I(2)$

...

Figure 6:
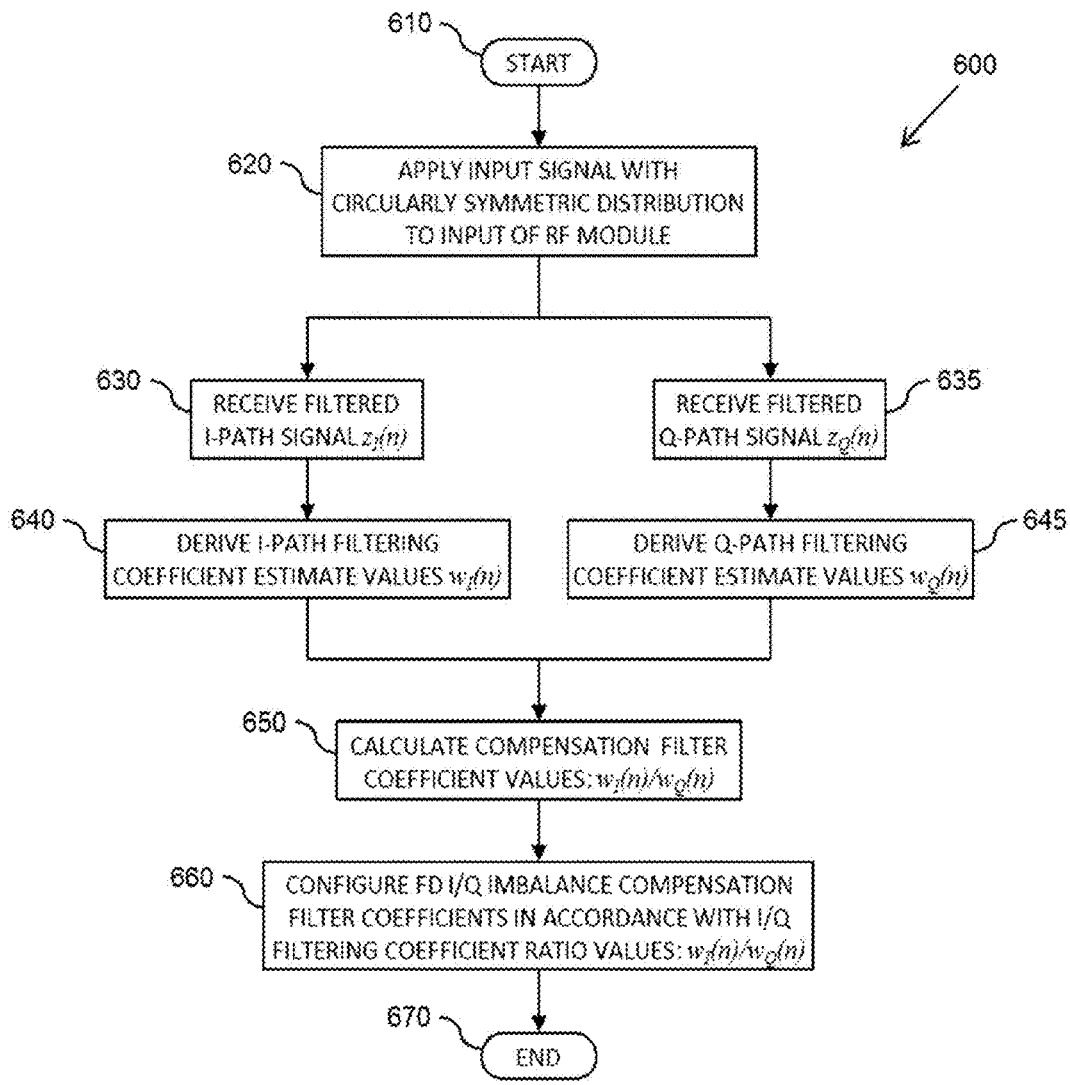
FIG. 6 illustrates a simplified flowchart of an example of a method of configuring at least one FD I/Q imbalance compensation filter within an RF module.

Referring now to FIG. 6, there is illustrated a simplified flowchart 600 of an example of a method of configuring at least one FD I/Q imbalance compensation filter within an RF module, such as may be implemented using the apparatus 400 illustrated in FIG. 4. The method starts at 610 and moves on to step 620 where an input signal is applied to an input of the RF module. In particular, an input signal comprising a circularly symmetric distribution may be applied to the input of the RF module.

Such an input signal may comprise a signal from a noise generator. For example, as illustrated in FIG. 4, an output of a noise generator 450 may be selectively coupled to the input of the RF module 100. In the illustrated example, a switch 460 is controllable to selectively couple the input of the RF module 100 to either the antenna 105 or the noise generator 450.

The noise generator 450 may be arranged to output a signal comprising coloured noise or white noise. The noise generator 450 may be selectively coupled before or after a low noise amplifier (not shown) of the RF receiver 100. The noise generator 450 may comprise one or more discrete components, separate from the RF receiver module. In some example embodiments, it is contemplated that the noise generator 450 may derive from one or more components within a transmitter module (not shown) for a transceiver of which the RF receiver module 100 forms a part, such as a power amplifier of the transmitter for example.

Such a noise generator 450 may be implemented in any suitable manner. For example, the noise generator 450 may comprise one or more of:

a reverse-biased diode;
a biased transconductor;
a resistor followed by an amplifier; and
a pseudo-random Gaussian noise source.

In some alternative examples, the input signal applied at step 620 of the method of FIG. 6 may comprise an RF signal received via the antenna 105. Any complex signal in which the real and imaginary parts have equal energy and autocorrelation, and the cross-correlation between real and imaginary parts which is zero is circularly distributed may be used. Examples of appropriate types of signal are QAM (Quadrature Amplitude Modulation) signals and PSK (Phase Shift Keying) modulated signals satisfying circularly symmetric criterion. Accordingly, correspondingly modulated signals received at the antenna 105 may be used to provide the input signal at step 620.

Referring back to FIG. 6, once the appropriate input signal has been applied to the input of the RF module at step 620, the method moves on to steps 630 and 635 where filtered I-path and Q-path signals are received respectively. For example, in FIG. 4 the filter coefficient configuration module 410 is arranged to receive a filtered I-path signal for the RF receiver module 100 comprising the digital signal ($z_I(n)$) 150 output by the I-path analogue to digital converter (ADC) 140 and a filtered Q-path signal for the RF receiver module 100 comprising the digital signal ($z_Q(n)$) 155 output by the Q-path ADC 145. Next, at steps 640 and 645, I-path and Q-path filtering coefficient estimate values are derived from the received filtered signals. For example, and as described in greater detail above, such coefficient estimate values may be derived using linear prediction (e.g. using a Levinson-Durbin recursion algorithm). One or more compensation filter coefficient value(s) is/are then calculated based on the derived I-path and Q-path filtering coefficient estimate values, at step 650. For example, and as described in greater detail above, the compensation filter coefficient value(s) may be calculated using a transverse IIR filter, such as the transverse IIR filter 440 illustrated in FIG. 5. One or more coefficient(s) within the FD I/Q imbalance compensation filter is/are then configured using the calculated compensation filter coefficient value(s), at step 660, and the method ends at step 670.

In the example illustrated in FIGS. 4 to 6, the FD I/Q imbalance compensation filter comprises a filter component within only the Q-path of the RF receiver module 100. As such, the method and apparatus hereinbefore described with reference to FIGS. 4 to 6 relate to configuring coefficients within such an FD I/Q imbalance compensation filter comprising a filter component within only one of the I-path and Q-path of an RF module.

Figure 7:
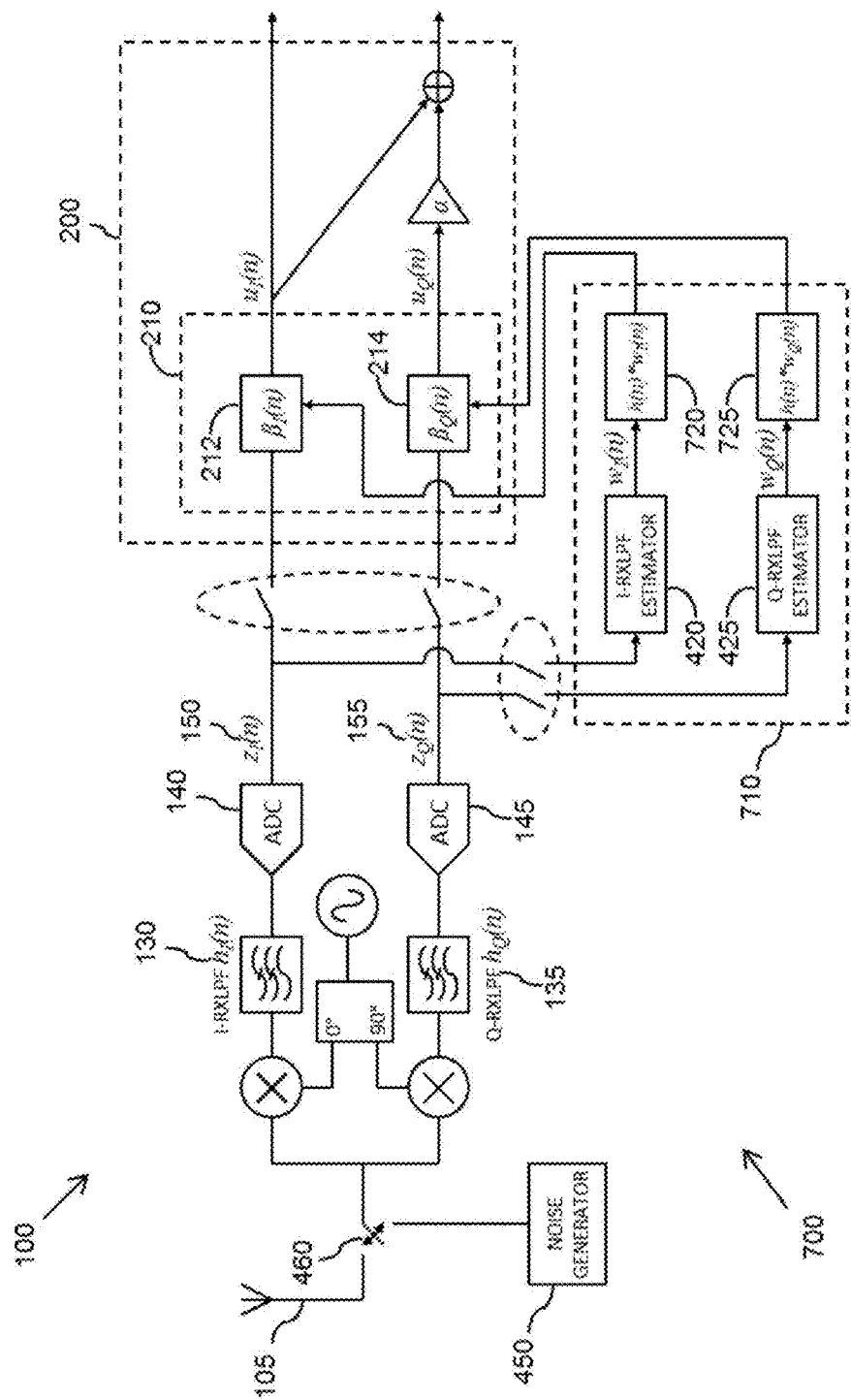
FIG. 7 illustrates a simplified block diagram of an alternative example of an apparatus for configuring an FD I/Q imbalance compensation filter.

Referring now to FIG. 7, there is illustrated a simplified block diagram of an alternative example of an apparatus 700 for configuring an FD I/Q imbalance compensation filter 210. In the example illustrated in FIG. 7, the FD I/Q imbalance compensation filter 210 comprises a first filter component 212 within the I-path of the RF receiver module 100 and a further filter component 214 within the Q-path of the RF receiver module 100. The apparatus 700 comprises a filter coefficient configuration module 710 for configuring one or more coefficients $\beta_I(n)$ within the first filter component 212 of the FD I/Q imbalance compensation filter 210 and one or more coefficients $\beta_Q(n)$ within the further filter component 214 of the FD I/Q imbalance compensation filter 210.

As for the example illustrated in FIG. 4, the filter coefficient configuration module 710 in FIG. 7 is arranged to receive a filtered I-path signal for the RF receiver module 100, such as the digital signal $(z_I(n))$ 150 output by the I-path ADC 140, and comprises an I-path filter estimator component 420 arranged to derive at least one I-path filtering estimate value $w_I(n)$ therefrom. The filter coefficient configuration module 410 is further arranged to receive a filtered Q-path signal for the RF receiver module 100, such as the digital signal $(z_Q(n))$ 155 output by the Q-path ADC 145, and comprises a Q-path filter estimator component 425 arranged to derive at least one Q-path filtering estimate value $w_Q(n)$ therefrom.

The filter coefficient configuration module 710 is arranged to configure the FD I/Q imbalance compensation filter 210 based at least partly on at least one ratio between the I-path and Q-path filtering estimate values $w_I(n)$ and $w_Q(n)$ derived by the filter estimator components 420, 425. In particular, in the example illustrated in FIG. 7 the filter coefficient configuration module 710 is arranged to configure the coefficient(s) $\beta_I(n)$ within the first filter component 212 of the FD I/Q imbalance compensation filter 210 based at least partly on the derived I-path filtering estimate value(s) $w_I(n)$, and to configure the coefficient(s) $\beta_Q(n)$ within the further filter component 214 of the FD I/Q imbalance compensation filter 210 correspondingly based at least partly on the derived Q-path filtering estimate value(s) $w_I(n)$. In this manner, the configuration of the coefficients $\beta_I(n)$ and $\beta_Q(n)$ within the first and further filtering components 212, 214 of the FD I/Q imbalance compensation filter 210 corresponds to the ratio between the I-path and Q-path filtering estimate values $w_I(n)$ and $w_Q(n)$ derived by the filter estimator components 420, 425.

As previously mentioned, the use of a linear prediction technique such as the Levinson-Durbin Recursion algorithm to derive the filtering estimate values $(w_I(n))$ 430 and $(w_Q(n))$ 435 may result in deriving filtering estimate values $(w_I(n))$ 430 and $(w_Q(n))$ 435 representative of the inverse of the actual filtering performed in the respective 'I' and 'Q' paths of the RF module 100. Accordingly, it is contemplated that the coefficients $\beta_I(n)$ and $\beta_Q(n)$ within the first and further filtering components 212, 214 of the FD I/Q imbalance compensation filter 210 may be calculated by, say, multiplying the filtering estimate values $(w_I(n))$ 430 and $(w_Q(n))$ 435 (which comprise estimated inverse I-path and Q-path filtering values) by n ideal filter value h (n) for the analogue low pass filters 130, 135 of the RF receiver module 100. In this manner, the coefficients $\beta_I(n)$ and $\beta_Q(n)$ may be representative of respective differences between the ideal filter value h(n) for the analogue low pass filters 130, 135 of the RF receiver module 100 and the actual filtering performed by the respective I-path and Q-path analogue low pass filters 130, 135 as estimated by the filter estimator components 420, 425.

As such, the filter coefficient configuration module 710 in the illustrated example of FIG. 7 comprises an I-path coefficient generator component 720 arranged to generate the coefficient(s) $\beta_I(n)$ for the first filter component 212 of the FD I/Q imbalance compensation filter 210 based on the derived I-path filtering estimate value(s) $w_I(n)$ and an ideal filter value h(n) for the analogue low pass filters 130, 135 of the RF receiver module 100 such that:

$$\beta_I(n) = h(n) * w_I(n)$$

The filter coefficient configuration module 710 in the illustrated example of FIG. 7 further comprises a Q-path coefficient generator component 725 arranged to generate the coefficient(s) $\beta_Q(n)$ for the further filter component 214 of the FD I/Q imbalance compensation filter 210 based on the derived Q-path filtering estimate value(s) $w_Q(n)$ and an ideal filter value h(n) for the analogue low pass filters 130, 135 of the RF receiver module 100 such that:

$$\beta_Q(n) = h(n) * w_Q(n)$$

Figure 8:
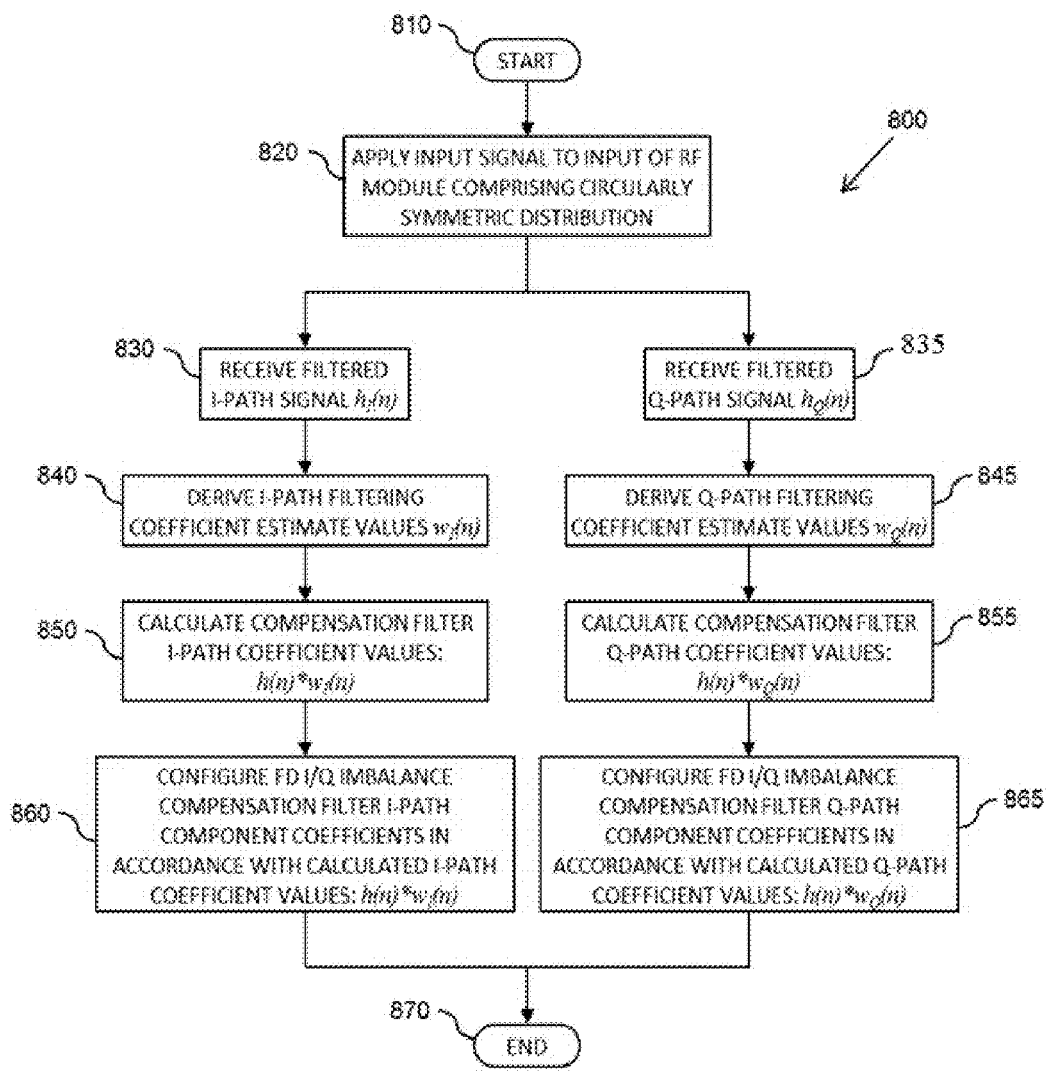
FIG. 8 illustrates a simplified flowchart of an alternative example of a method of configuring at least one FD I/Q imbalance compensation filter within an RF module.

Referring now to FIG. 8, there is illustrated a simplified flowchart 800 of an example of a method of configuring at least one FD I/Q imbalance compensation filter comprising at least a first filter component within the I-path of an RF module 100 and at least one further filter component within the Q-path of the RF module 100, such as may be implemented using the apparatus 700 illustrated in FIG. 7. The method starts at 810 and moves on to step 820 where an input signal is applied to an input of the RF module. In particular, an input signal comprising a circularly symmetric distribution may be applied to the input of the RF module. Such an input signal may comprise a signal from a noise generator. For example, as illustrated in FIG. 7, an output of a noise generator 450 may be selectively coupled to the input of the RF module 100. In the illustrated example, a switch 460 is controllable to selectively couple the input of the RF module 100 to either the antenna 105 or the noise generator 450.

Once the appropriate input signal has been applied to the input of the RF module, the method moves on to steps 830, 835 where filtered I-path and Q-path signals are received respectively. For example, in FIG. 7 the filter coefficient configuration module 710 is arranged to receive a filtered I-path signal for the RF receiver module 100 comprising the digital signal $(z_I(n))$ 150 output by the I-path analogue to digital converter (ADC) 140 and a filtered Q-path signal for the RF receiver module, I-path and Q-path filtering coefficient estimate values are derived from the received filtered signals (steps 840, 845). For example, and as described in greater detail above, such coefficient estimate values may be derived using linear prediction (e.g. using a Levinson-Durbin recursion algorithm).

Having derived the I-path and Q-path filtering coefficient estimate values, the method moves on to steps 850 and 855 where compensation filter coefficient values are calculated for the I-path and Q-path filter components respectively of the FD I/Q imbalance filter. For example, and as described above with reference to FIG. 7, the coefficients $\beta_I(n)$ and $\beta_Q(n)$ for the I-path and Q-path filter components 212, 214 of the FD I/Q imbalance compensation filter 210 may be calculated based on the respective derived I-path and Q-path filtering estimate values $w_I(n)$ and $w_Q(n)$ and an ideal filter value h(n) for the analogue low pass filters 130, 135 of the RF receiver module 100. The I-path and Q-path filter components of the FD I/Q imbalance compensation filter are the configured in steps 860 and 865 respectively in accordance with their respective calculated coefficient values. The method then ends at 870.

Examples of methods and apparatuses for configuring an FD I/Q imbalance filter within an RF receiver module have hereinbefore been described with reference to the accompanying drawings. However, it is contemplated that the present invention is not limited to the configuration of FD I/Q imbalance filter within an RF receiver modules, and may equally be applied to other forms of complex (I/Q) RF modules. FIGS. 9a and 9b illustrate simplified block diagrams of an example of an apparatus 900 for configuring FD I/Q imbalance compensation filters within each of an RF receiver module and an RF transmitter module of an RF transceiver.

In a first configuration stage illustrated in FIG. 9a, an analogue noise generator 910 is operably coupled via switch 920 to an input of a front end 930 of the RF receiver module, and applies an input signal thereto. A filter coefficient configuration module (also denoted as "I/Q imbalance config.") 940 receives filtered I-path and Q-path signals for the RF receiver module, and derives I-path and Q-path filtering estimate values therefrom. The filter coefficient configuration module 940 then configures one or more FD I/Q imbalance compensation filters within the RF receiver module based at least partly on at least one ratio between the derived I-path and Q-path filtering estimate values. For example, the filter coefficient configuration module 940 may be implemented by way of the filter coefficient configuration module 410 illustrated in FIG. 4 and described above, or the filter coefficient configuration module 710 illustrated in FIG. 7 and described above. In this manner, the FD I/Q imbalance compensation filter(s) of the receiver module are first configured using an input signal from the analogue noise generator 910, based at least partly on at least one ratio between the derived I-path and Q-path filtering estimate values.

In a second configuration stage illustrated in FIG. 9b, the switch 920 operably couples an output of a front end 950 of the RF transmitter module to the input of the front end 930 of the RF receiver module, and a noise signal from a digital noise generator 960 is applied to an input of the RF transmitter module. In this manner, the noise signal applied to the input of the RF transmitter module is passed through the RF transmitter module (within which discrete 'I' and 'Q' filtering is performed), and is looped back into the RF receiver module, where further discrete 'I' and 'Q' filtering is performed. The filter coefficient configuration module 940 receives the filtered I-path and Q-path signals for the RF receiver module, and derives I-path and Q-path filtering estimate values therefrom. For example, the filter coefficient configuration module 940 may use the I-path and Q-path filtering estimate values derived for the RF receiver module in the first configuration stage to derive I-path and Q-path filtering estimate values corresponding to filtering performed within 'I' and 'Q' paths of the RF transmitter module. The filter coefficient configuration module 940 may then configure one or more FD I/Q imbalance compensation filters within the RF transmitter module based at least partly on at least one ratio between the derived I-path and Q-path filtering estimate values corresponding to the filtering performed within 'I' and 'Q' paths of the RF transmitter module. In this manner, the FD I/Q imbalance compensation filter(s) of the RF transmitter module may also be configured by the filter coefficient configuration module 940, using an input signal from the digital noise generator 960, based at least partly on at least one ratio between the derived I-path and Q-path filtering estimate values therefor.

Exemplary embodiments of the present invention have been described comprising methods and/or apparatuses for configuring FD I/Q imbalance compensation filters within RF modules based at least partly on at least one ratio between derived I-path and Q-path filtering estimate values. As will be appreciated by a skilled artisan, the exemplary embodiments herein described comprise blind algorithms whereby such I-path and Q-path filtering estimate values are derived from received I-path and Q-path filtered signals. Advantageously, the blind algorithms required to implement the present invention comprise a significantly reduced complexity compared to the blind algorithms of the prior art.

Figure 3A:
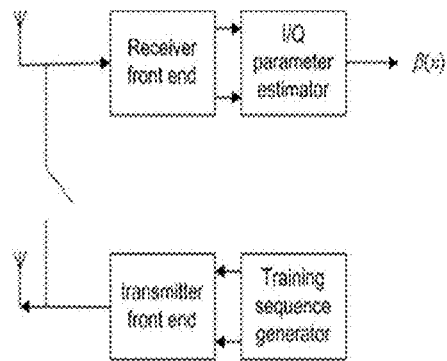
FIGS. 3a to 3e illustrates simplified diagrams of known approaches for configuring a frequency dependent (FD) I/Q imbalance compensation filter.
Figure 3B:
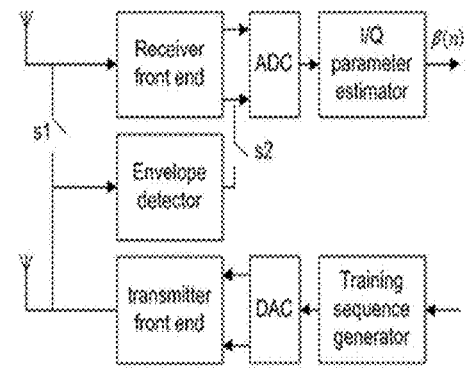
Figure 3C:
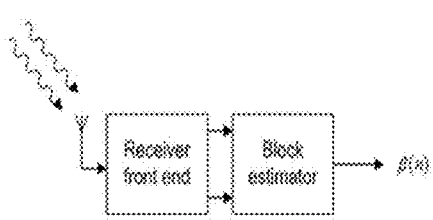
Figure 3D:
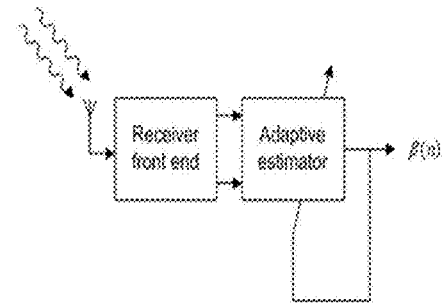

For example, the first known blind algorithm technique described above for configuring an FD I/Q imbalance compensation filter with reference to FIG. 3c (which involves Equation 1) requires 4L real correlations (where L is the number of taps within the FD I/Q imbalance compensation filter to be configured) and has a complexity of 2 to 4 L×L matrix inverses, each with $L^3$ complex multiply-add operations (cubic complexity). The use of such a non-linear iterative technique involving using a matrix inversion means that the complexity of such a solution is prohibitive for filter lengths of greater than three due to the number of multipliers required and thus the die area required to implement such multipliers.

The second known blind algorithm technique described above for configuring an FD I/Q imbalance compensation filter with reference to FIG. 3c (involving computing Discrete Fourier Transforms (DFT's) of the autocorrelations and dividing them to obtain a magnitude of β(n)) only requires 3L real correlations. However, this known technique still comprises a complexity of:

$64L + 80L \cdot \log_2(8L)$ real multiplication operations
$80L \cdot \log_2(8L)$ real addition operations
$4L$ real division operations Thus, for this known blind algorithm technique a filter length L of, say, 8 would result in a complexity of 4352 real multiplication operations, 3840 real addition operations and 32 real division operations.

By contrast, the proposed technique of the present invention requires 3L real correlations with a complexity of just:

$(5L^2/2)-(L/2)+2$ real multiplication operations
$(5L^2/2)-(L/2)+2$ real addition operations
$2L$ real division operations Thus, for the proposed technique of the present invention a filter length L of, say, 8 would result in a complexity of 158 real multiplication operations, 158 real addition operations and 16 real division operations Advantageously, such a low computation complexity enables on-the-fly configuration of FD I/Q imbalance filters to be performed, for example using over-the-air transmitted data. In this manner, any variations over time in the I-path and/or Q-path filtering of the RF module, for example due to temperature and/or pressure variations or simply due to variation over time as a result of the age of components etc., may be compensated for.

Figure 3E:
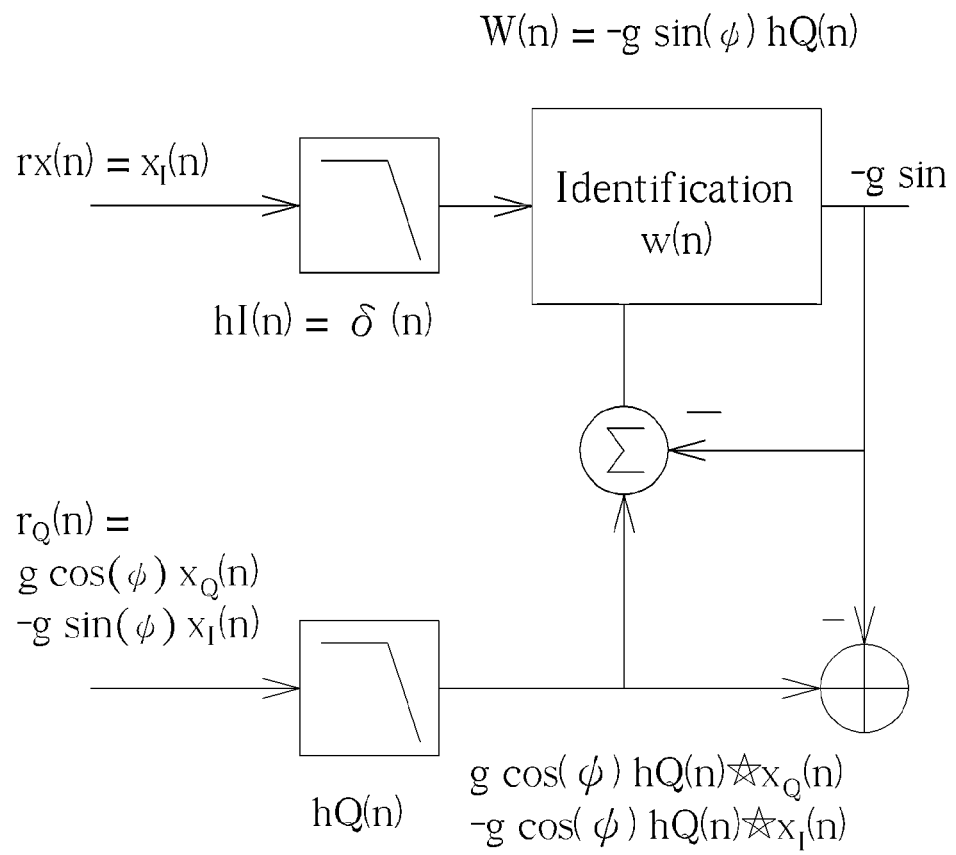

Furthermore, unlike the known technique described above with reference to FIG. 3e, no significant modifications are required to the RF module itself in the proposed technique of the present invention, and thus the problem of increased power consumption of the RF circuitry, and also degradation of the noise performance when limited by headroom, is substantially avoided.

Simulations of the proposed technique of the present invention have also shown that performance is not sensitive to the extent of the FI I/Q imbalance, unlike the known technique described above with reference to FIG. 3e which requires FI I/Q balancing.

In addition, with a 2× sampling rate for the ADC components there are nulls in the band edge. The second known blind algorithm technique described above for configuring an FD I/Q imbalance compensation filter with reference to FIG. 3c (involving computing Discrete Fourier Transforms (DFT's) of the autocorrelations and dividing them to obtain a magnitude of β(n)) comprises dividing two frequency responses. Such nulls can result in a divide by zero condition, causing this known technique to breakdown and fail. In contrast, the proposed solution of the present invention is robust to sampling rate. The proposed solution of the present invention is also robust to fading channels, unlike the second known blind algorithm technique described above for configuring an FD I/Q imbalance compensation filter with reference to FIG. 3c.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated embodiments the filter coefficient configuration modules 410, 710 have been illustrated as discrete logical/functional components. However, in some example embodiments, the filter coefficient configuration modules 410, 710 may be implemented as integral components of, say, the FD I/Q imbalance compensation filter 210.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the filter coefficient configuration modules 410, 710 may be implemented within an RFIC device comprising the RF transceiver. Alternatively, the examples may be implemented as any number of separate integrated circuits or separate devices interconnected with each other in a suitable manner. For example, in some embodiments, it is contemplated that the filter coefficient configuration modules 410, 710 may be implemented in separate (e.g. standalone) integrated circuit devices.

The filter coefficient configuration module 410, 710, or portions thereof, may be implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired device functions by operating in accordance with suitable program code. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A method of configuring at least one frequency dependent (FD), in-phase/quadrature (I/Q), imbalance compensation filter within a radio frequency (RF) module, the method comprising:
    applying an input signal to an input of the RF module;
    receiving a filtered I-path signal for the RF module and deriving at least one I-path filtering estimate value therefrom;
    receiving a filtered Q-path signal for the RF module and deriving at least one Q-path filtering estimate value therefrom; and
    configuring the at least one FD I/Q imbalance compensation filter based at least partly on at least one ratio between the derived I-path and Q-path filtering estimate values.

2. The method of claim 1, wherein the input signal applied to the input of the RF module comprises a circularly symmetric distribution.

3. The method of claim 1, wherein the method comprises deriving the at least one I-path filtering estimate value and the at least one Q-path filtering estimate value using linear prediction.

4. The method of claim 1, wherein deriving the at least one I-path filtering estimate value and the at least one Q-path filtering estimate value comprises using linear prediction to estimate inverse I-path and Q-path filtering values respectively.

5. The method of claim 1, wherein the method comprises deriving the at least one I-path filtering estimate value and the at least one Q-path filtering estimate value using a Levinson-Durbin recursion algorithm.

6. The method of claim 1, wherein the at least one FD I/Q imbalance compensation filter comprises at least one filter component of length L, and the method comprises:
deriving an I-path filtering estimate comprising at least L coefficient estimate values;
deriving a Q-path filtering estimate comprising at least L coefficient estimate values; and
configuring L coefficient values for the at least one filter component of the FD I/Q imbalance compensation filter based at least partly on coefficient ratios between the derived I-path and Q-path coefficient estimate values.

7. The method of claim 1, wherein the method comprises:
determining at least one filtering ratio value for the I-path and Q-path of the RF module based at least partly on the derived I-path and Q-path filtering estimate values; and
configuring at least one coefficient value within the at least one FD I/Q imbalance compensation filter based at least partly on the determined at least one filtering ratio between the derived I-path and Q-path filtering estimate values.

8. The method of claim 7, wherein the at least one FD I/Q imbalance compensation filter comprises at least one filter component within one of the I-path and Q-path of the RF module, and the method comprises configuring at least one coefficient of the at least one filter component to comprise the determined at least one filtering ratio between the derived I-path and Q-path filtering estimate values.

9. The method of claim 7, wherein the method comprises calculating the at least one filtering ratio value for the I-path and Q-path of the RF module using a transverse infinite impulse response filter.

10. The method of claim 1, wherein the at least one FD I/Q imbalance compensation filter comprises at least a first filter component within the I-path of the RF module and at least one further filter component within the Q-path of the RF module, and the method comprises:
configuring at least one coefficient of the at least first filter component based at least partly on the derived at least one I-path filtering estimate value; and
configuring at least one coefficient of the at least one further filter component based at least party on the derived at least one Q-path filtering estimate value.

11. The method of claim 10, wherein the method further comprises:
calculating at least one coefficient for the at least first filter component based at least partly on the derived at least one I-path filtering estimate value and an ideal filter value for the RF module;
calculating at least one coefficient for the at least one further filter component based at least partly on the derived at least one Q-path filtering estimate value and the ideal filter value for the RF module; and
configuring at least one coefficient of each of the at least first and at least one further filter components based at least partly on the respective calculated at least one coefficients therefor.

12. The method of claim 11, wherein:
deriving the at least one I-path filtering estimate value and the at least one Q-path filtering estimate value comprises using linear prediction to estimate inverse I-path and Q-path filtering values respectively;
calculating at least one coefficient for the at least first filter component comprises multiplying at least one ideal I-path filter value by at least one estimated inverse I-path filtering value; and
calculating at least one coefficient for the at least one further filter component comprises multiplying at least one ideal IQ-path filter value by at least one estimated inverse Q-path filtering value.

13. The method of claim 1, wherein the method comprises configuring at least one FD I/Q imbalance compensation filter within at least one of:
an RF receiver module; and
an RF transmitter module.

14. The method of claim 13, wherein the method comprises first configuring at least one FD I/Q imbalance compensation filter within an RF receiver module of an RF transceiver, and subsequently configuring at least one FD I/Q imbalance compensation filter within an RF transmitter module of the RF transceiver.

15. The method of claim 1, wherein the input signal applied to the input of the RF module comprises at least one of:
a signal from a noise generator; and
an RF signal received via an antenna.

16. The method of claim 1, wherein the method comprises configuring the at least one FD I/Q imbalance compensation filter on-the-fly.

17. A filter coefficient configuration module for configuring at least one coefficient for at least one frequency dependent (FD), in-phase/quadrature (I/Q), imbalance compensation filter within a radio frequency (RF) module; the filter coefficient configuration module being arranged to:
receive a filtered I-path signal for the RF module and derive at least one I-path filtering estimate value therefrom;
receive a filtered Q-path signal for the RF module and derive at least one Q-path filtering estimate value therefrom; and
configure the at least one coefficient for the at least one FD I/Q imbalance compensation filter based at least partly on at least one ratio between the derived I-path and Q-path filtering estimate values.

18. An integrated circuit device comprising at least one filter coefficient configuration module according to claim 17.

19. A communication unit comprising at least one filter coefficient configuration module according to claim 17.

* * * * *